United States Patent [19]

Karos et al.

[11] Patent Number: 4,784,054

[45] Date of Patent: Nov. 15, 1988

[54] EQUIPMENT FOR HOLDING OR STAGING PACKAGED SANDWICHES

[75] Inventors: Gus Karos, Mayfield Heights; Nick Karos, Pepper Pike, both of Ohio; Ralph E. Weimer, Wheaton, Ill.; Norman R. Sloan, New Lenox, Ill.; Dye O. Miller, Barrington, Ill.

[73] Assignee: Restaurant Technology, Inc., Oak Brook, Ill.

[21] Appl. No.: 901,909

[22] Filed: Aug. 28, 1986

[51] Int. Cl.⁴ .................... H05B 1/02; A47J 36/24
[52] U.S. Cl. ........................... 99/483; 99/389; 219/214; 219/408
[58] Field of Search ............... 99/331, 339, 358, 483, 99/467, 468, 516; 219/395, 399, 400, 214, 386, 408, 405; 426/107, 110, 113, 114; D7/347, 348, 362, 364, 365, 367, 352, 362, 339

[56] References Cited

U.S. PATENT DOCUMENTS

| | | | |
|---|---|---|---|
| 3,586,823 | 6/1971 | Schier | 219/214 X |
| 3,908,749 | 9/1975 | Williams | 219/214 X |
| 4,119,834 | 10/1978 | Losch | 219/214 X |
| 4,508,035 | 4/1986 | Luscher | 219/405 X |

FOREIGN PATENT DOCUMENTS

| | | | |
|---|---|---|---|
| 2810685 | 9/1979 | Fed. Rep. of Germany | 99/483 |
| 2845318 | 9/1979 | Fed. Rep. of Germany | 99/483 |
| 3340684 | 5/1985 | Fed. Rep. of Germany | 99/483 |

Primary Examiner—Timothy F. Simone
Attorney, Agent, or Firm—Jenner & Block

[57] ABSTRACT

Equipment for holding or staging a bicompartmented sandwich package is disclosed. The equipment comprises supporting structure for supporting several packages, and heating elements for applying heat to only a part of the package. The support includes an uninterrupted floor supporting the warmed or hot compartment of the package, and shelving structure for supporting the unwarmed or cool package compartment. Heaters are disposed above and below the hot compartment. The support structure is arranged to retain the heat around the warmed or hot compartment. One embodiment, the floor structure is inclined so as to urge packages in the structure to slide downwardly to a pre-determined pick-up point.

16 Claims, 5 Drawing Sheets

EQUIPMENT FOR HOLDING OR STAGING PACKAGED SANDWICHES

BACKGROUND OF THE INVENTION

This invention relates generally to food product holding or staging equipment, and more particularly concerns equipment for maintaining the quality and condition of a pre-packaged food product having separated hot and cold components.

Phenomenal success has come to many restaurants and stores specializing in the fast preparation and sale of food. Among the most popular of food items are sandwiches, especially the well-nigh beloved hamburger sandwich. To attract and satisfy increasing numbers of customers, these restaurants sell their hamburger sandwiches in a variety of styles. One sandwich form which has met with great commercial success comprises a bun heel, a delicious cooked hamburger patty, lettuce, tomatoes, condiments, and a bun crown. Throughout the McDonald's system of stores or restaurants, this sandwich is sold in association with the trademark McD.L.T.

The McDonald's System operators want to serve all their products in a state of maximum attractiveness and quality, and their desires for the McD.L.T. sandwich are no exception. To this end, most McD.L.T. sandwiches are now delivered to the customer in a two-compartment package. In one un-warmed compartment, often called the cool side compartment, is found the bun crown, the lettuce, and the tomato slices. In the other warmed compartment, often called the hot side compartment, is located the hamburger bun heel and the warm, ready-to-eat meat patty. The package is designed to close securely and to inhibit heat and moisture from passing from the hot side compartment to the cool side compartment.

Meat, lettuce and tomato sandwiches such as these can be offered to the consumer quickly if the sandwiches are prepared and packaged before the customer arrives at the restaurant or store. When this system is employed, the restaurant operators prepare and package the sandwich products, and then hold or stage the filled and closed packages for a limited period of time before they are purchased by the consumer. When the customer opens the package, he or she then combines the bun crown, lettuce and tomato with the other portions of the sandwich to produce a desirable, tasty and yet inexpensive meal.

It is the general object of the present invention to provide equipment for holding or staging a bi-compartmented food package and the contained food. While the present invention is illustrated in use with a hamburger sandwich, it will be understood that other varieties of food can be offered in a bi-compartmental container without departing from the present invention.

A more specific object is to provide holding or staging equipment which warms but one compartment of a bi-compartmental food package. In other words, it is an object to provide equipment especially adapted to keep a relatively hot compartment and contents hot, and a relatively cool compartment and contents cool. A related object is to provide equipment which will prolong the acceptable holding or staging time of the packaged end product food.

Another object is to provide such equipment which is inexpensive to manufacture and maintain, which is inexpensive to operate, and which will provide a long and trouble-free service life.

SUMMARY OF THE INVENTION

To meet these objectives, equipment is provided for holding or staging sandwich components and a bi-compartmented sandwich package. The equipment comprises supporting structure for supporting the packages, and heating elements for applying heat to only a part of the package. The support includes an uninterrupted floor supporting the warmed or hot compartment of the package, and shelving structure for supporting the un-warmed or cool compartment. Heaters are disposed above and below the hot compartment. The support structure is arranged to retain the heat around the warmed or hot compartment. In one embodiment, the floor structure is inclined so as to urge packages in the structure to slide downwardly to a pre-determined pick-up point.

Other objects and aspects of the invention will become apparent upon reading the following detailed description and upon reference to the claims. Throughout the drawings, like reference numerals refer to like parts.

DETAILED DESCRIPTION

Figure 1:
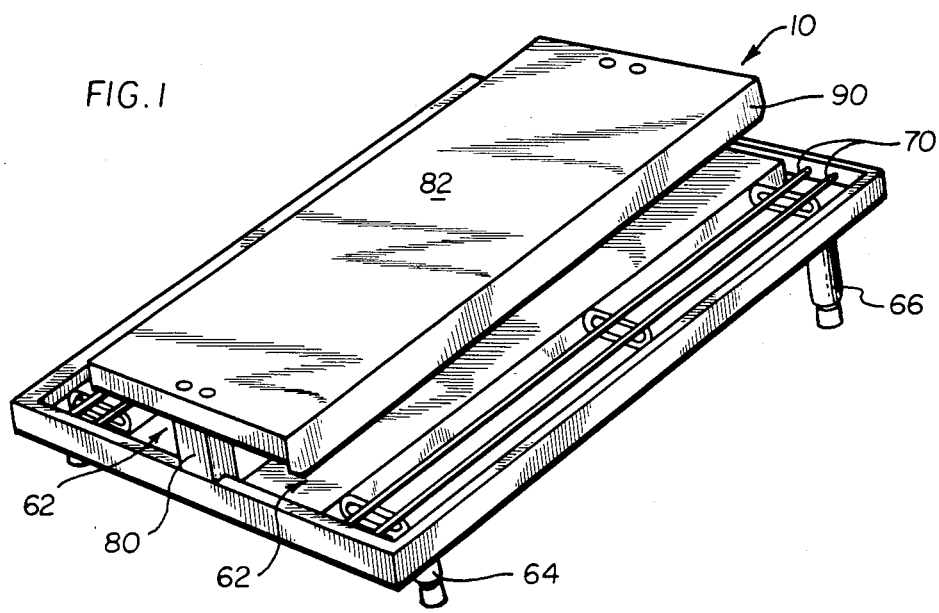
FIG. 1 is a perspective view showing a first embodiment of the novel staging or holding equipment.

While the invention will be described in connection with several preferred embodiments, it will be understood that it is not intended to limit the invention to these embodiments. On the contrary, it is intended to cover all alternatives, modifications and equivalents as may be included within the spirit and scope of the invention as defined by the appended claims.

Turning first to FIGS. 1–5, there is shown equipment 10 for holding or staging a bi-compartmented sandwich package 12. As especially suggested in FIGS. 3–5, it is contemplated that the package 12 is formed of styrofoam plastic or like material, and it can be considered to have two compartments. In the example shown, one warmed or hot compartment 14 contains a bun heel 16 and a cooked, warm, and moist meat patty 18. In the opposite unwarmed or cool compartment 20 is a bun crown 22, which can be dressed with various condiments and topped with portions of crisp lettuce 24 and fresh tomato slices 26. Each compartment 14 and 20 is defined by a bottom 28 and 30, sloped walls 32 and 34, and a top 36 and 38. Between the compartments 14 and 20, the styrofoam package-forming material is arranged to provide a moisture and heat barrier 40. In the illustrated package, this barrier 40 is formed so as to provide a somewhat depressed region 42 between the compartments 14 and 20. (See FIG. 5.)

In general, the staging or holding equipment 10 can be considered to include supporting structure 50 for supporting the packages 12, and heating structure 52. The heating structure applies heat to only a part of the package 12, and it is shaped and designed to retain the applied heat only around the hot compartment 14 of the package 12. In the embodiment illustrated in FIGS. 1-5, the support structure 50 takes the form of a substantially planar floor support surface 56, which here includes a closed or uninterrupted floor element 58 and an adjacent open rack arrangement 60 mounted so as to be substantially co-planar with the closed floor portion 58.

Figure 2:
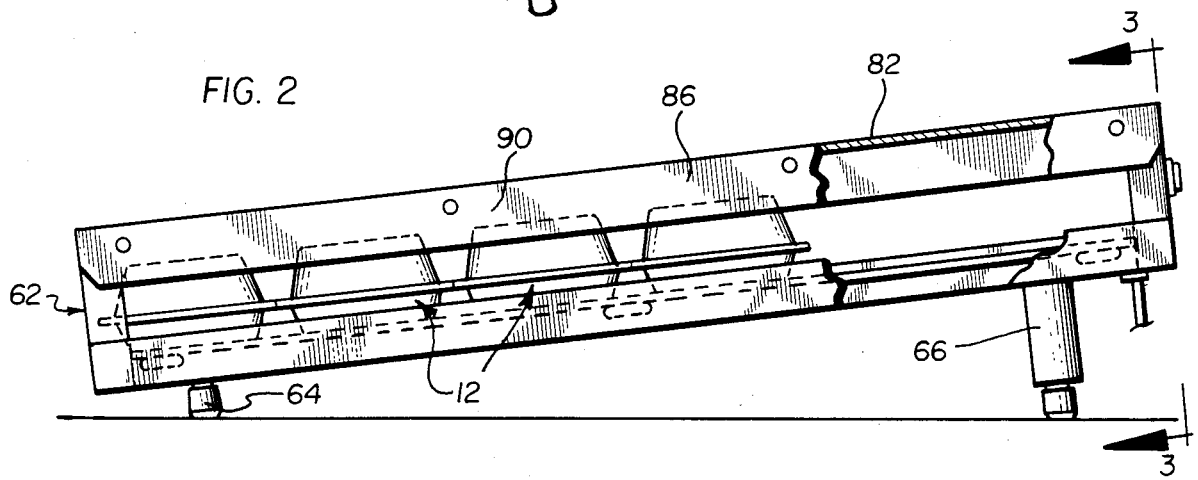
FIG. 2 is a side elevational view of the equipment shown in FIG. 1 and showing an exemplary sandwich package held or staged in the equipment.
Figure 3:
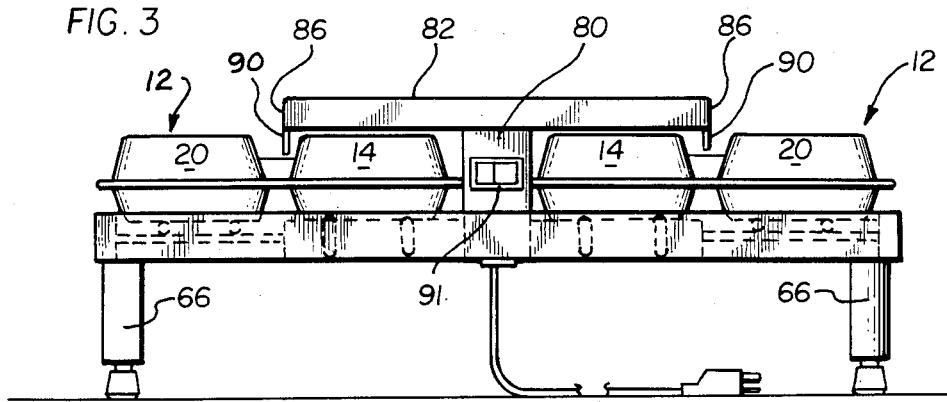
FIG. 3 is a developed view taken substantially in the plane of line 3—3 in FIG. 1 and showing a rear or elevated end of the equipment and packages.
Figure 4:
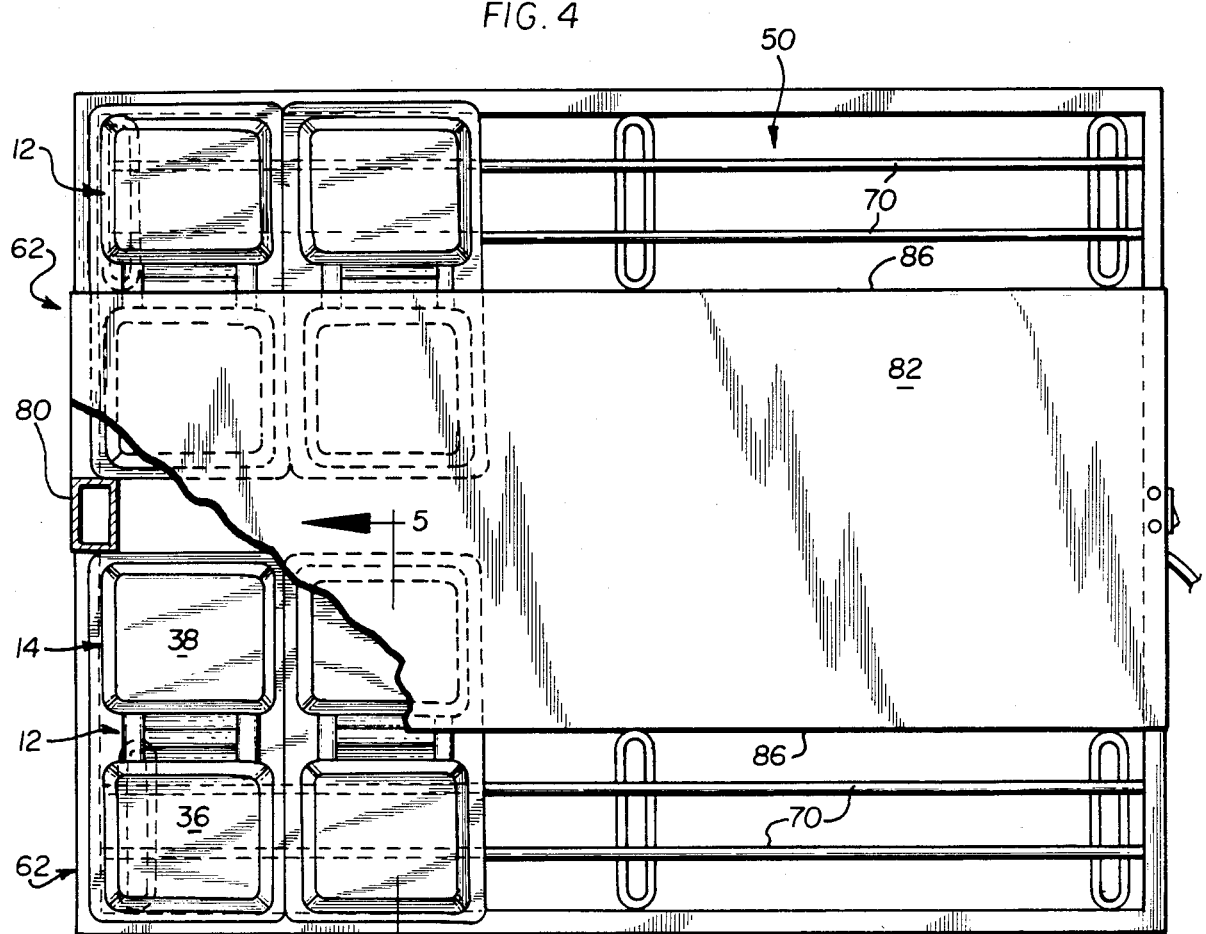
FIG. 4 is a top plan view of the equipment shown in FIGS. 1-3, a portion of the equipment top being broken away to show details of the equipment.
Figure 5:
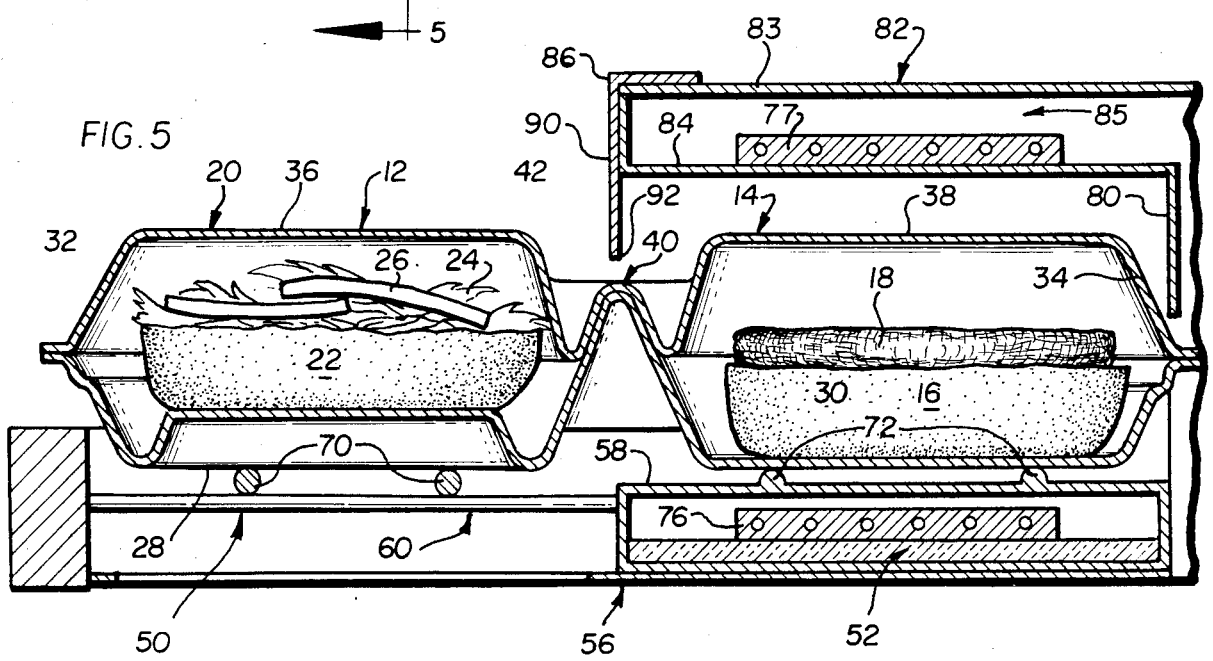
FIG. 5 is a fragmentary sectional view taken substantially in the plane of line 5—5 of FIG. 4.

In carrying out the invention, the floor arrangement 50 is inclined so as to urge sandwich packages to slide towards a pre-determined pick-up position 62 as especially suggested in FIGS. 1 and 2. To this end, the equipment is provided with relatively short front legs 64 and longer or taller rear legs 66. In order that the packages will slide downwardly toward the pick-up point 62 with as little friction as practicable, the open rack floor element 60 is provided with a few relatively narrow rods 70, and the uninterrupted floor element 58 is provided with several elongated rod-like embossments 72. These rods 70 and embossments 72 provide lines of minimal equipment-package contact so as to encourage the packages 12 to slide as easily as possible downwardly within the equipment. As shown in FIG. 5, the rack element 70 supports only a portion of the unwarmed compartment bottom 28. In this way, air at ambient temperature can circulate around the unwarmed package compartment 20 so as to encourage that compartment 20 to remain at the ambient temperature of the restaurant kitchen or food preparation area.

In accordance with another aspect of the invention, heat is positively supplied to the region of the warmed or hot compartment 14 and structure is provided to retain that heat in the region of the compartment 14. To this end, electrically energized blanket or tape heaters 76 are located within the uninterrupted floor element 58 below the warmed package compartment 14, and commercially available heaters 77 are located in a ceiling 82, so as to actively supply heat from above and below only to the region of the warmed package compartment 14. While commercially available tape heaters are illustrated here, it will be understood that other forms of heaters or heat sources could also be used in the positions illustrated.

To retain the supplied heat around the warmed package compartment 14 in accordance with the invention, the equipment illustrated in FIGS. 1-5 is provided with a centralized wall structure 80 extending upwardly from a mediate portion of the floor 58. The ceiling 82 is mounted atop the wall 80 generally coplanar with the floor structure 56, and it extends outwardly from the wall 80 in either direction. Together, the ceiling 82 and wall 80 form a generally T-shaped array above the floor 56 so as to accommodate warmed package compartments 14 adjacent to and on either side of the wall 80, as especially illustrated in FIGS. 4 and 5. The ceiling 82 includes a top or roof piece 83, below which is a Z-shaped channel 84, connected to a distal heat trap wall or curtain element 90. Between the roof 83 and channel 84 is a space 85 which accommodates the tape heater 77 or other wiring.

The unwarmed package compartments 20 are supported by the floor rack elements 70, but they are located outside the distal margins 86 of the ceiling 82. From each ceiling distal margin 86, the heat trap wall or curtain 90 extends downwardly, so as to trap heat between the floor element 58 and the overlying ceiling 82 and around the warmed sandwich package compartment 14. The lower edge 92 of the heat trap wall 90 is adapted to extend downwardly to a position between the compartments 14 and 20 of the sandwich package 12 in the depressed region 42 of the package.

Power can be supplied to the heaters 76 and 77 by a power supply cord through an off-on switch 91. The heaters 76 and 77 are mounted in the floor 56 and the ceiling 82, but they are located on either side of the central vertical wall 80, as especially suggested in FIGS. 1 and 5. This wall 80, ceiling 82 and uninterrupted floor element 36 partly surround only the warmed sandwich package compartments 14. Heat emanating from the blanket heaters 76 and 77 is trapped between the floor 56 and the overlying ceiling 82.

An alternate embodiment of the invention is illustrated in FIGS. 6-11. Here, too, the holding or staging equipment includes means for supporting the bi-compartmented sandwich packages 12, and means for applying heat to only a part of the package. The supporting structure includes a number of horizontal bi-ended floors 100 arrayed vertically, as especially illustrated in FIGS. 7 and 8. Vertical supports 102, 104 located at each end of the floors 100 transfer the weight of the apparatus and any support packages 12 to support legs and feet 106. A top 107 extends between the vertical supports 102 and 104 and over the top of shelves 100. As especially suggested in FIG. 10, electrically powered heaters 110 are mounted to or within each floor element 100 so as to apply heat to only the warmed compartment 14 of the adjacent package 12 from both above and below. A power cord 109 and off-on switch 111 supply power to the heaters 110. A thermostat may be included if desired. An uninterrupted cabinet back portion 112 provides, together with the vertical sides 102 and 104, a series of compartments which are open only at their respective fronts, so as to trap heat provided by the heater elements 110 and retain that heat adjacent the warmed package compartments 14.

Figure 6:
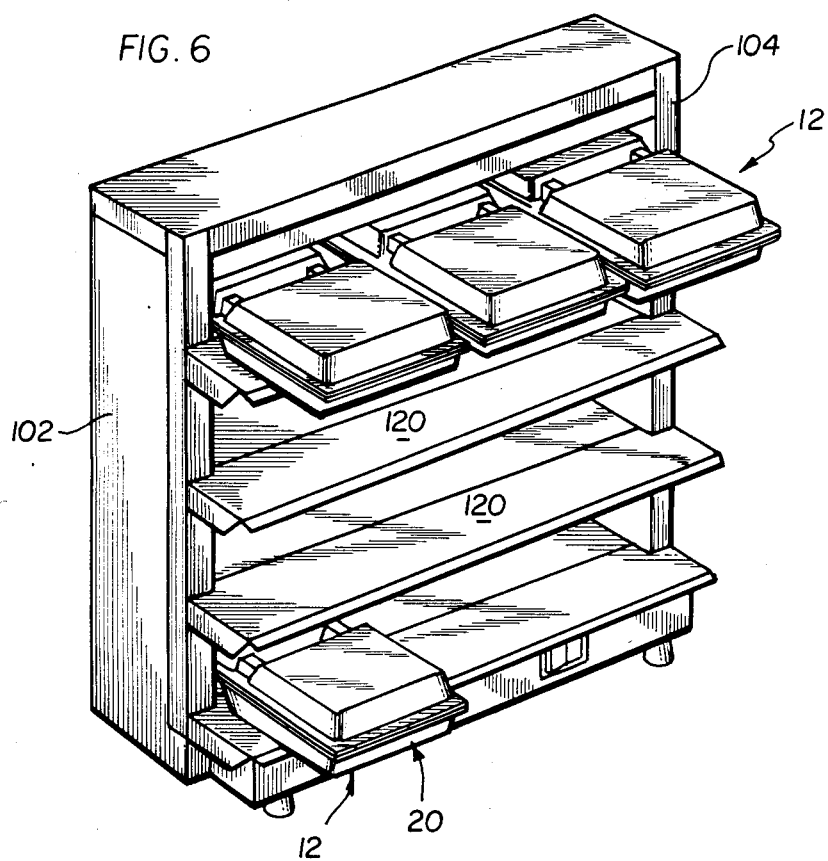
FIG. 6 is a perspective view of a second embodiment of the equipment.
Figure 7:
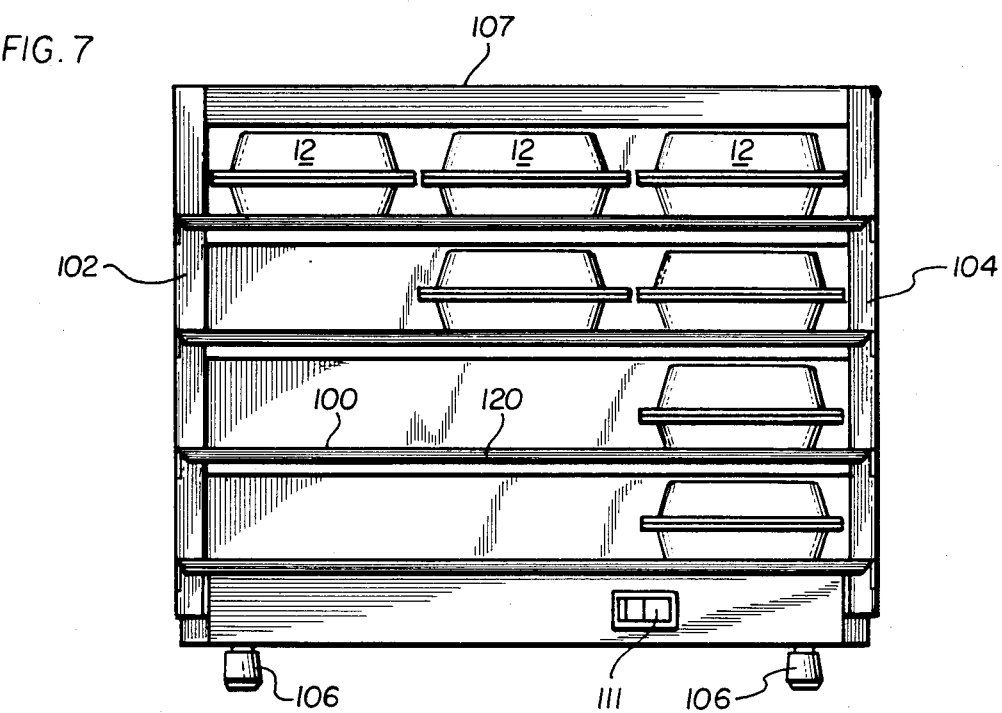
FIG. 7 is a front elevational view of the equipment shown in FIG. 6.
Figure 8:
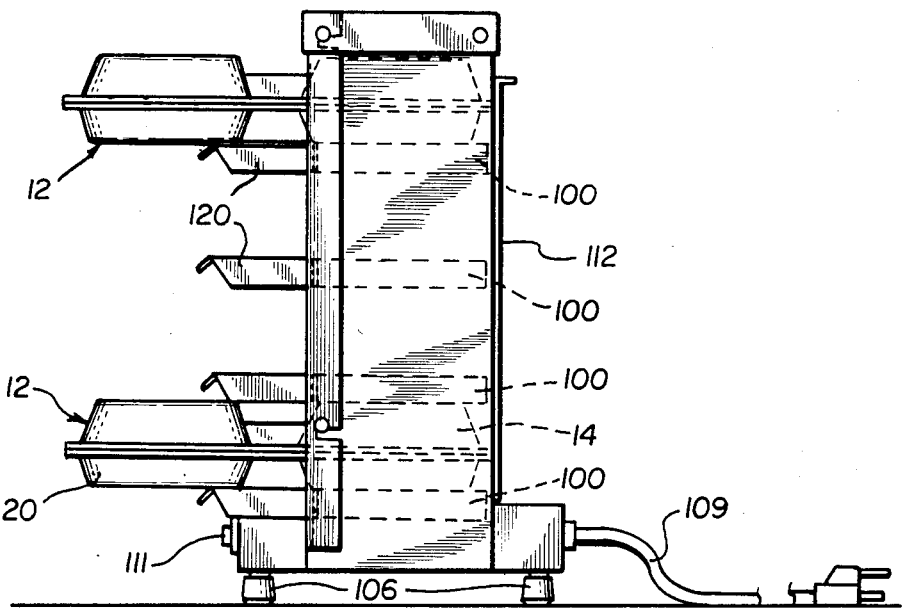
FIG. 8 is a side elevational view of the equipment shown in FIGS. 6 and 7.
Figure 9:
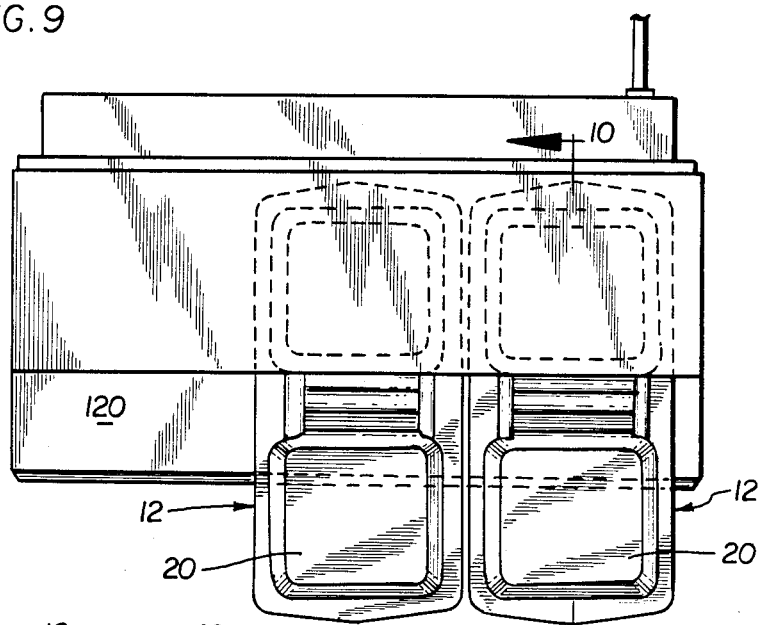
FIG. 9 is a top plan view of the equipment shown in FIGS. 6, 7 and 8.
Figure 10:
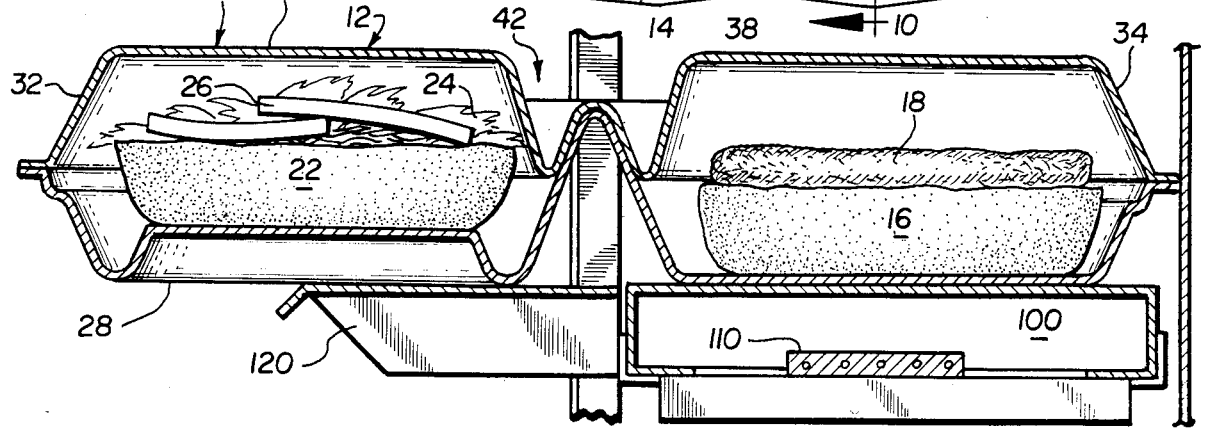
FIG. 10 is a fragmentary sectional view taken substantially in the plane of line 10—10 in FIG. 9.
Figure 11:
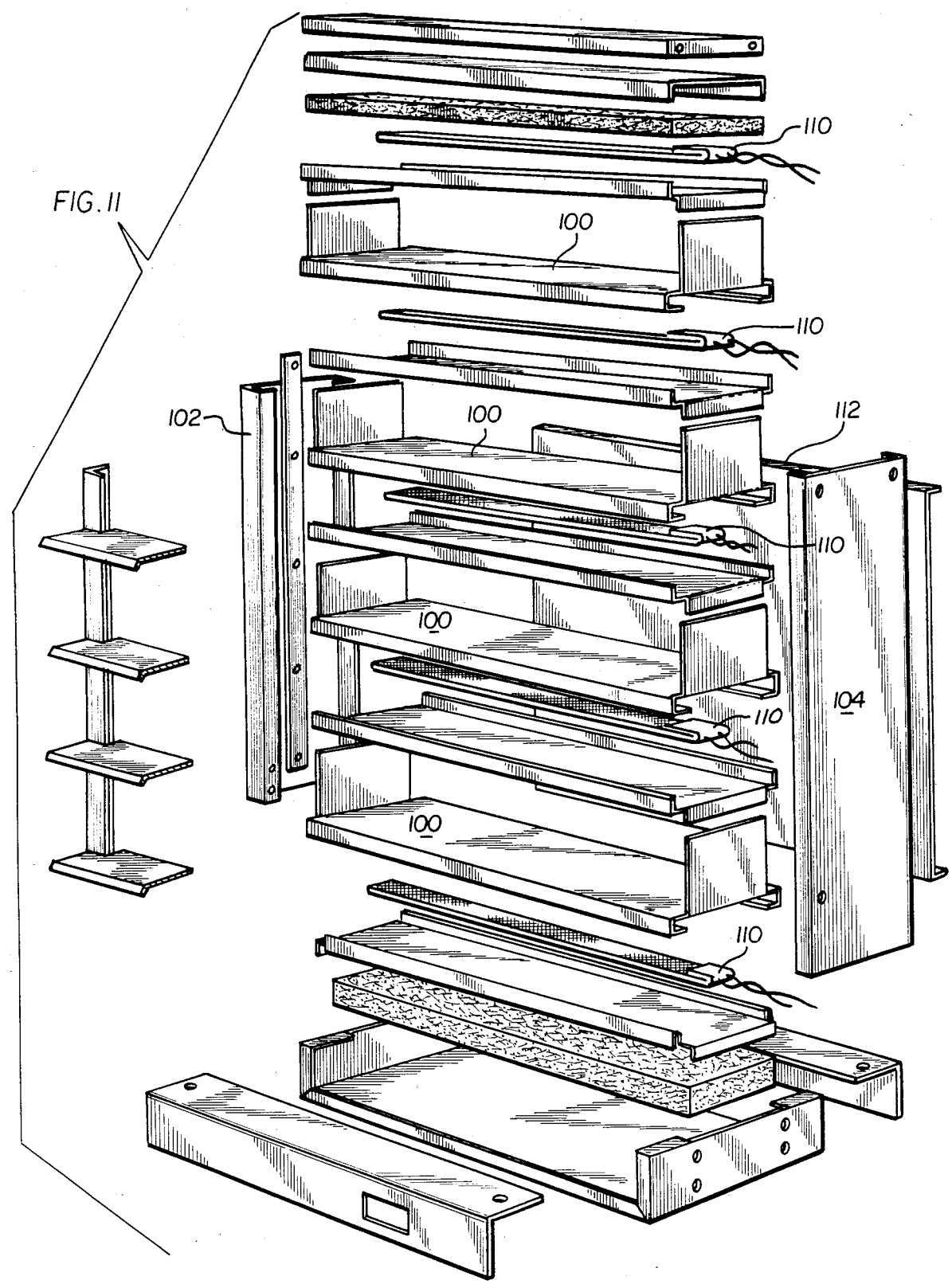
FIG. 11 is an exploded view of the equipment shown in FIGS. 6–10.

To support at least part of the unwarmed package compartment 12, shelf elements 120 are mounted in cantilevered arrangement to each floor member 100, as especially suggested in FIGS. 6 and 8. Each shelf element 120 is mounted to an adjacent floor 100 independently of the vertical walls 102, 104, so that heat may escape around the edges of the shelves 120 without extensively heating the unwarmed compartment 20 of the sandwich package 12. In addition, these shelves 120 do not extend under the full area of the unwarmed compartment bottom 28. Rather, the shelves 120 support only a part of the unwarmed compartment bottom 28 so that heat may escape around the edges of the shelf 120 without extensively heating the unwarmed compartment 20 of the sandwich package 12.

What is claimed is:

1. Equipment for staging a compartmented sandwich package having at least two compartments, the equipment comprising, in combination: supporting means for supporting the package under the compartments; heating means for applying heat to only a preselected compartment of the package; and means for retaining heat adjacent that compartment of the package to which heat is applied.

2. Equipment according to claim 1 wherein said supporting means and said heating means includes a floor means for supporting at least part of the bottoms of both package compartments, with only that portion of the floor means adjacent to said preselected compartment being heated, whereby only said preselected compartment is heated.

3. Equipment according to claim 2 wherein said floor means includes a substantially planar support surface.

4. Equipment according to claim 2 wherein said means for retaining heat includes a wall and a ceiling surface for partially surrounding, together with said floor means, only one of the sandwich package compartments.

5. Equipment according to claim 4 wherein said heating means includes heater elements mounted in said floor means and said ceiling for actively supplying heat from above and below to only one of the sandwich package compartments.

6. Equipment according to claim 5, wherein said heating means includes an electrically energized heater.

7. Equipment according to claim 4 further including heat trap wall means extending downwardly from said ceiling to trap heat between said floor and said ceiling.

8. Equipment according to claim 7 wherein said heat trap wall means is adapted to extend downwardly to a position between the compartments of said bi-compartment sandwich package.

9. Equipment according to claim 2 wherein said floor means is inclined so as to urge sandwich packages placed upon the floor means to slide towards a predetermined pick-up position.

10. Equipment according to claim 2 wherein said floor means includes a first floor element for supporting a warmed compartment, and a co-planar shelf element for supporting at least a part of another compartment bottom.

11. Equipment according to claim 10 wherein said co-planar shelf element supports only a part of said other compartment.

12. Equipment according to claim 3 wherein said floor means includes an uninterrupted floor element for supporting a warmed compartment and a substantially coplanar rack element for at least partly supporting an unwarmed compartment.

13. Equipment for staging compartmented sandwich packages having at least two compartments, the packages each including a compartment for holding relatively warmed food and a compartment for holding relatively unwarmed food, the equipment comprising: supporting means for supporting the packages under the compartments, including a plurality of horizontally disposed floors mounted in a spaced vertical array and a plurality of vertical supports for supporting the floors; and heating means for applying heat to only a part of the package, including a heater element mounted to each floor capable of supplying heat above and below the floor in which it is mounted, whereby heat is applied to only the warmed food compartments of packages positioned above and below that heater element.

14. Equipment according to claim 13 wherein said supporting means includes a shelf element mounted in cantilevered arrangement to each floor for supporting at least a part of the un-warmed compartment.

15. Equipment according to claim 14 wherein said shelf element is mounted to an adjacent floor independently of said vertical support, so that heat may escape around the edges of said shelf without extensively heating the unwarmed compartment of the sandwich package.

16. Equipment according to claim 15 wherein said shelf element extends so as to support only a part of the un-warmed compartment of the package, so that heat may escape around the edges of said shelf without extensively heating the unwarmed compartment of the sandwich package.

* * * * *